Nov. 12, 1968   B. H. KAMENS   3,411,062
D.C. OPERATED ELECTRONIC GOVERNOR FOR D.C. MOTOR
Filed March 18, 1965   5 Sheets-Sheet 1

INVENTOR
Bruce H. Kamens
BY Donald P. Gillette
ATTORNEY

Nov. 12, 1968  B. H. KAMENS  3,411,062
D.C. OPERATED ELECTRONIC GOVERNOR FOR D.C. MOTOR
Filed March 18, 1965   5 Sheets-Sheet 2

INVENTOR
Bruce H. Kamens
BY Donald P. Gillette
ATTORNEY

INVENTOR
Bruce H. Kamens
BY Donald P. Gillette
ATTORNEY

Fig. 9.

INVENTOR
Bruce H. Kamens
BY Donald P. Gillette
ATTORNEY

United States Patent Office 3,411,062
Patented Nov. 12, 1968

3,411,062
D.C. OPERATED ELECTRONIC GOVERNOR FOR D.C. MOTOR
Bruce H. Kamens, Thomaston, Conn., assignor to Consolidated Electronics Industries Corp., New York, N.Y., a corporation of Delaware
Filed Mar. 18, 1965, Ser. No. 440,890
23 Claims. (Cl. 318—331)

ABSTRACT OF THE DISCLOSURE

A governor circuit for D.C. motors operated from direct current and incorporating a voltage controlled current discharge device in series with the motor. One electrode of the discharge device is also connected to a reference voltage so that the conductivity of the discharge device is controlled by comparison of the reference voltage and the back E.M.F. of the motor. Separate means are also provided to turn the discharge device off periodically to permit the back E.M.F. to compare to the reference voltage. In this way discharge device controls the speed of the motor by allowing pulses of driving current to be applied to the motor to cause the motor to run at a speed at which its back E.M.F. will be related to the reference voltage in a pre-determined ratio.

---

The present invention relates to an electronic circuit for automatically controlling the speed of direct-current electric motors. In particular, it relates to a governor circuit in which a voltage-controlled current discharge device is connected in series with the motor and is periodically rendered nonconductive to permit the back electromotive force, or E.M.F., of the motor to be compared with a reference voltage. In the simplest form, the comparison may be carried out directly by the voltage-controlled current discharge device. Alternatively, the comparison may be carried out separately to produce a resultant control signal to be applied to the discharge device to return it to its conductive state at a time determined by the relative magnitudes of the back E.M.F. and the reference voltage.

The back E.M.F. of a direct-current motor is a voltage generated by the motor, itself, as its rotor turns. A direct-current motor is basically a device having two magnetic field-producing elements, one of which is free to move or turn with respect to the other. At least one of the magnetic fields is produced by a current flowing in a coil of wire, and this current must be commutated, or turned on and off repetitively, to maintain the proper relationship between the magnetic fields to keep the movable member turning with respect to the stationary member. As a result, there will be relative movement between the coil of wire and the magnetic field produced by the other element. According to Lenz's law, this produces, across the terminals of the coil, a self-generated voltage of the same polarity as the applied voltage. At the same time there is also produced in the coil a current of opposite polarity to the applied current. The self-generated voltage is known as the back E.M.F. of the motor and is always of lower magnitude than the applied, or driving, voltage.

If the circuit in which the self-generated current flows is opened, as for example by interrupting the circuit through which driving current is supplied to the motor, the back E.M.F. will continue to be generated in direct-current motors of the type with which the present invention is concerned, even though no current is flowing, and this back E.M.F. may be measured at the motor terminals. The magnitude of the back E.M.F. is proportional to the speed of the motor and therefore decreases as the motor slows to a stop after the driving current has been removed.

In the present invention, the operating voltage is connected to the motor by a voltage-controlled current discharge device having anode and cathode electrodes between which a conductive path can be established, and a control electrode that is effective in establishing the conductive path but is substantially without any effect thereafter. Basically, in the present invention the motor is connected in series with the anode and cathode electrodes, and the normally conductive path therebetween is periodically made nonconductive. The back E.M.F. present at the terminals of the motor is then compared with a reference voltage in a suitable circuit in such a way as to produce a control signal that can be applied to the control electrode of the discharge device to return to its conductive state when the control signal reaches a predetermined level. Re-establishment of the conductive path permits the motor to receive its energizing voltage again, which causes the rotor to speed up again, at least incrementally, until the next time the conductive path is interrupted.

It is one of the principal objects of this invention to provide an electronic governor circuit for controlling the speed of a direct-current motor. Other objects are to control the speed of direct-current electric motors within fairly close limits by a simple and inexpensive but rugged circuit, and to control the speed of such motors to a higher degree of accuracy than is possible by mechanical governing means alone. It is also an object to control the speed of relatively high-power motors.

Further objects will become apparent from the following specification together with the drawings, in which.

Figures 1A, 1B, 2A:
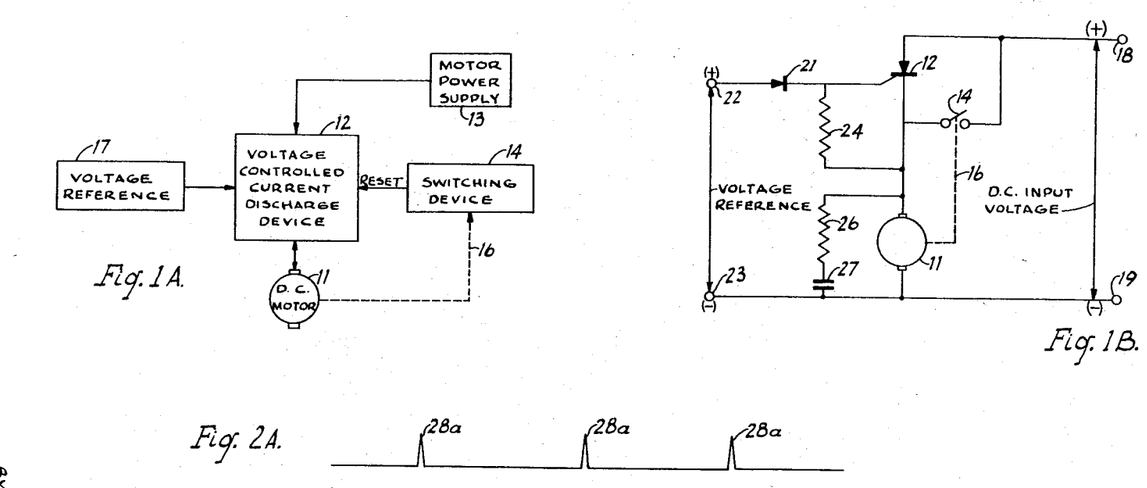
FIGS. 1a and 1b are, respectively, a block diagram and a schematic diagram of a simple circuit embodying the invention.
FIGS. 2a and 2b are waveforms typical of the operation of the circuit in FIG. 1.

The block diagram in FIG. 1 shows the basic regulating structure as connected to a direct-current motor 11. In series with the motor is a voltage-controlled current discharge device 12, which may be, for example, a silicon-controlled rectifier, or S.C.R., that acts as a switch between the motor 11 and a supply 13 of electric power. The S.C.R. 12 has an anode, a cathode, and a control, or gate, electrode. When the anode and cathode are connected to suitable voltage sources, current will not flow through the S.C.R. until the proper bias voltage is applied. However, once the S.C.R. becomes conductive, the gate electrode will not be able to make it stop conducting. Instead the S.C.R. must be rendered non-conductive by reducing its anode current below a minimum conduction level. In the circuit of FIG. 1a this is done by a switching device 14 electrically connected to the discharge device and mechanically connected to the motor 11, as indicated by the dotted line 16, to be operated thereby. Rotation of the rotor causes the switching device to be periodically closed, thus short-circuiting the S.C.R. 12 and reducing its anode current below the minimum required to sustain conduction. A voltage reference source 17 is connected to the S.C.R. 12 to provide a bias voltage that permits the S.C.R. to remain nonconductive even after the switch 14 has reopened. The switch 14 need close only for an instant, and as soon as it reopens, the voltage directly across the motor 11 drops to the value of the back E.M.F., which immediately starts to decrease as the motor coasts toward a stop.

The S.C.R. returns to the conductive state when the back E.M.F. reaches a level comparable to the voltage level of the voltage reference source 17, which permits the gate electrode to have a forward bias. When the back E.M.F. reaches this level, the S.C.R. 12 returns to its conductive state to reconnect the motor 11 to the motor power supply 13

FIG. 1b shows a schematic diagram corresponding to the block diagram in FIG. 1a. The motor power supply is connected to terminals 18 and 19 which are in series with the S.C.R. 12. In this circuit the switching device 14 may be simply a mechanical switch mechanically connected to the rotor of the motor 11, as indicated by the connecting link 16, to be closed momentarily each time the rotor reaches a certain position as it revolves. This short-circuits the S.C.R. 12, which immediately causes it to become nonconductive. Thereafter, as the rotor rotates away from the position in which the switch 14 is closed, the switch again opens but now the S.C.R. 12 is nonconductive and will remain so until the cathode becomes negative with respect to the gate electrode.

The gate control electrode is connected by way of a diode 21 to the reference voltage source, which is applied to the terminals 22 and 23. The voltage reference 17 and the motor power supply 13 of FIG. 1a are not shown in FIG. 1b since they are not parts of the governor circuit, per se. A resistor 24 connects the gate electrode to the motor 11 to stabilize operation of the S.C.R. Since the gate electrode is held at a predetermined reference voltage by means of the voltage reference source, the S.C.R. will become conductive when its cathode is approximately one volt negative with respect to the reference voltage, and as soon as it becomes conductive, the reference voltage and the gate electrode cease to have any effect on its operation. The S.C.R. thus compares the voltage level at its cathode with the voltage level at its gate electrode. The purpose of the diode 21 is to prevent the reference source from being adversely affected when the voltage on the cathode of the S.C.R. 12 suddenly rises when conduction starts.

A resistor 26 and a capacitor 27 are connected in series directly across the terminals of the motor 11 to reduce the high frequency electrical voltage variation, known as commutation noise, that is generally present at the terminals of the motor 11. This electrical noise must be limited because it has an adverse effect on the operation of the S.C.R. 12 as the latter seeks to compare the reference voltage with the back E.M.F. of the motor.

FIG 2a shows the waveform of current passing through the switching device 14. As may be seen, the current occurs in short pulses 28a. These pulses may not be precisely evenly spaced because the rotational speed of the motor normally varies somewhat about its nominal speed, but over a reasonable interval the speed will average out to approximately the nominal speed.

Figure 2B:
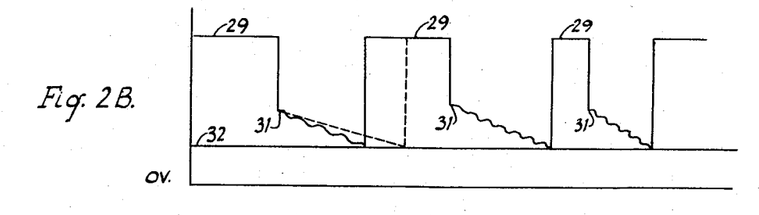

FIG. 2b is the voltage waveform, somewhat exaggerated, across the terminals of the motor 11. As may be seen, at the time of occurrence of each of the pulses 28, the voltage across the motor drops from a voltage level 29, which is nearly equal to the voltage of the motor power supply, to a lower value 31, which is the back E.M.F. of the motor. This value decreases as the motor slows down until it reaches the level 32 that represents the reference voltage level. At this point, the cathode electrode reaches a voltage level, relative to the reference voltage on the gate electrode, at which the S.C.R. 12 becomes conductive and raises the voltage across the motor back up to level 29. It will be understood that voltages and currents of the reverse polarity may be used if a corresponding change is made in the S.C.R.

FIG. 2b illustrates the variations in power pulses applied to the motor 11. Some pulses are short and some are long, but they average out to a value commensurate with the nominal motor speed. FIG. 2b also shows, in dotted lines, the effect of reducing the mechanical drag, or load, on the motor. In this case it takes longer for the rotor to slow down and thus longer for the back E.M.F. to fall to the reference level 32. This means, as would be expected, that the motor draws current for shorter periods of time and hence less current overall than in the case when it is heavily loaded and rotating at the same speed.

Figure 3A:
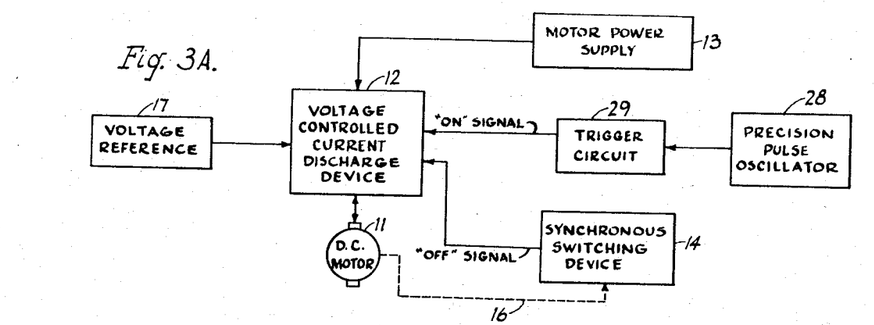
FIGS. 3a and 3b are, respectively, a block diagram and a schematic diagram of a modified governor circuit according to the invention.

FIG. 3a is a block diagram of a modified form of the invention capable of controlling the speed of a direct-current motor more precisely than the circuit of FIG. 1. To the extent that the same components are used, they will be given the same reference numerals. As in FIG. 1, the voltage-controlled current discharge device 12 connects the motor 11 to the motor power supply 13, and the switching device 14 is connected to the discharge device 12 to render the latter periodically non-conductive. The voltage reference source 17 is also connected to the discharge device 12 so that the magnitude of the back E.M.F. of the motor 11 can be compared with the reference voltage from the source 17 for a partial control of the discharge device 12. Unlike the circuit of FIG. 1, the circuit of FIG. 3a does not depend merely upon comparison of the magnitude of the back E.M.F. with the magnitude of the reference voltage. Instead, the circuit of FIG. 3a includes a pulse oscillator 28 which controls a trigger circuit 29 to establish the precise instant at which the discharge device 12 is to be made conductive. The frequency of the signal produced by pulse oscillator 28 may be controlled as precisely as desired in order to achieve the necessary degree of accuracy of control of the speed of motor 11. Normally, of course, the greater the precision of the oscillator 28 the more expensive it will be, but for certain uses the greatest possible accuracy is mandatory.

Figure 3B:
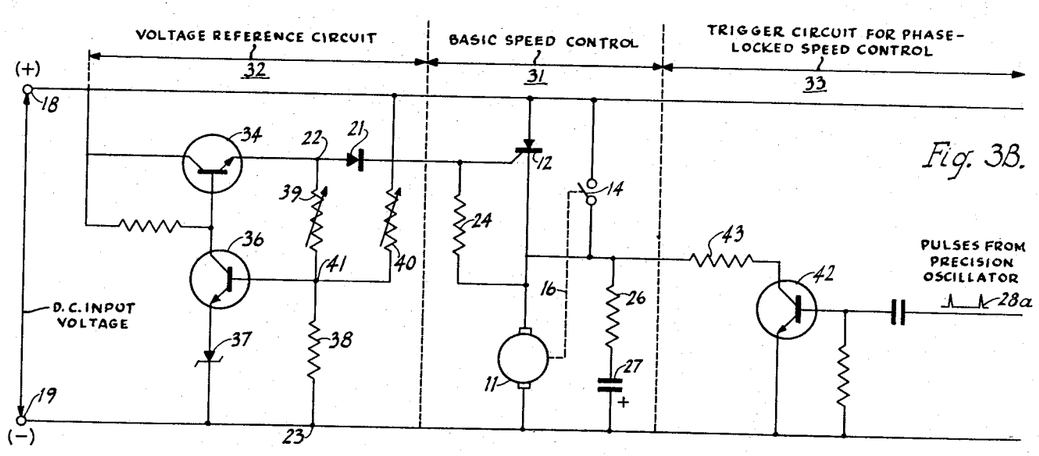

The components of the block diagram of FIG. 3a, except for the voltage supplies, are shown in the schematic diagram of FIG. 3b. In this figure the circuit is divided into a basic speed control section 31, a voltage reference circuit section 32 and a trigger circuit section 33. The basic speed control section is identical with the circuit in FIG. 1b and need not be described again. The voltage reference circuit 32 is simply a voltage regulator connected to the terminals 18 and 19 that supply the operating voltage for the motor 11. The voltage regulator includes a series regulator transistor 34, the emitter of which is connected to the reference voltage terminal 22 and the collector of which is connected to the power supply terminal 18. A second transistor 36 is connected to a Zener diode 37 and to the junction 41 of three resistors, 38–40. Resistor 38 is connected to the terminal 19 and resistor 39 is connected to the terminal 22 so that these two resistors form a voltage divider. The transistor 36, therefore, acts as a comparison device to compare the voltage at the junction 41 to the voltage across the Zener diode 37, and the collector of the transistor 36 is connected to the base of transistor 34 to control the impedance of the latter transistor to stabilize the voltage between the terminals 22 and 23. The purpose of resistor 40, which is connected between the junction 31 and the voltage supply terminal 18, is to provide additional comparison with the power supply voltage so that the operation of the voltage regulator will also be determined in part directly by this power supply voltage.

Positive pulses of voltage from the pulse oscillator 28 are connected to the base of a transistor 42, the emitter-collector circuit of which is connected in series with a resistor 43. This series circuit is connected directly across the terminals of the motor 11 to act as an electrical load across the terminals of the motor whenever the transistor is made conductive.

The circuit of FIG. 3b operates best when the speed of motor 11, and hence the back E.M.F. across the motor terminals, decreases relatively rapidly when the S.C.R. 12 becomes nonconductive. It has been found that the motor of U.S. Patent No. 2,513,340 of A. W. Haydon is particularly suited to operation with the circuit of FIG. 3b, apparently because the aluminum cage rotor of this motor has an eddy current damping that causes it to slow down relatively rapidly, similar to the way it would slow down if it were subjected to viscous damping.

Operation of the circuit of FIG. 3b begins in the same way as operation of the basic circuit in FIG. 1 with momentary short-circuiting of the S.C.R. 12 by the switch 14 as the rotor of the motor 11 revolves, which causes the S.C.R. to become nonconductive and to remain nonconductive after the switch 14 reopens, cutting off the supply of operating current to the motor. The voltage across the terminals of the motor drops to the level of the back E.M.F., and the back E.M.F. itself starts to drop as the rotor begins to lag behind the position it would have occupied if its operating current had not been interrupted. Subsequently, one of the pulses, normally the next occurring pulse, applied to the trigger circuit transistor 42 causes the latter to become conductive, allowing current to flow from the motor 11, which is actually acting as a generator at that instant due to the fact that it is running only on momentum and is generating a back E.M.F., through a voltage-divider circuit comprising the internal impedance of the motor, the resistor 43, and the transistor 42. The current flowing in that voltage-divider circuit causes a voltage drop across the internal impedance of the motor that causes the voltage across the motor 11 to drop sharply. As a result, the cathode of the S.C.R. 12 is brought suddenly to a voltage level at which the S.C.R. becomes conductive. Because of the fact that the conduction of the transistor 42 simply places a load across the motor 11, this circuit may be thought of as operating by brute force.

Figures 5A, 5B:
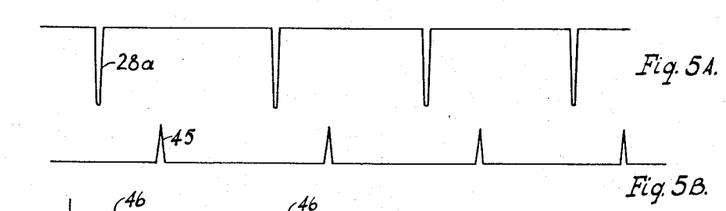
FIGS. 5a and 5b are signal waveforms corresponding to those observed in the embodiment of FIGS. 3 and 4.
Figure 5C:
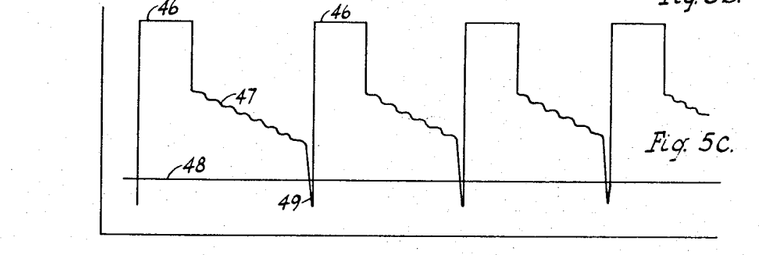

The operation of the circuit of FIGS. 3a and 3b is illustrated by the waveforms in FIG. 5. In FIG. 5 there is shown a series of pulses 28a which are applied to the base of transistor 42 from the reference oscillator. These pulses are independent of the operation of the motor. FIG. 5b shows the pulses 45 of current through the switch 14 which occur later than the pulses 40. From the occurrence of each of the pulses 28a until the occurrence of the next following pulse in 45, the S.C.R. 12 will be conductive and will permit operating current to flow from the power supply to the motor 11. The resultant variation of voltage across to the motor 11 is indicated in FIG. 5c. From the time of each of the pulses 28a to the time of the next succeeding pulse 45, the voltage across the motor 11 is at the level 46, which is substantially equal to the level of the supply voltage, less only the voltage drop across the S.C.R. 12. At the occurrence of the pulse 45, the S.C.R. 12 becomes non-conductive and the voltage across the motor 11 drops immediately to the level of its back E.M.F. Since the motor is no longer energized, it begins to slow down or to lag behind the position it would occupy if it had continued to receive power from the power supply. As it lags, its back E.M.F. drops, as indicated by the decreasing level 47, but it does not reach the level 48, which corresponds to the voltage on the gate electrode of the S.C.R. 12. However, at the occurrence of the next succeeding pulse 28a, the heavy current conducted through the transistor 42 in FIG. 3b causes the level of the voltage across the motor 11 to drop sharply. If the E.M.F. has decreased sufficiently at this time, and if the conductivity through the transistor 42 is sufficiently great, the voltage across the motor 11 will drop sharply through the level 48 of the reference voltage, as indicated by the negative-going peak 49, which will bring the voltage of the gate electrode of the S.C.R. 12 into the conductive region. Thereupon, the S.C.R. 12 will resume its conduction of current and the voltage level across the motor 11 will jump back up to the level 46.

When the motor is started, there is a period of time, which may be quite short, during which its speed builds up. During this time the S.C.R. is continuously conductive until the speed of the rotor reaches about 90% of the regulated speed. Thereafter, the normal operation of the regulator takes over to bring the rotor up to the desired speed.

Figure 4A:
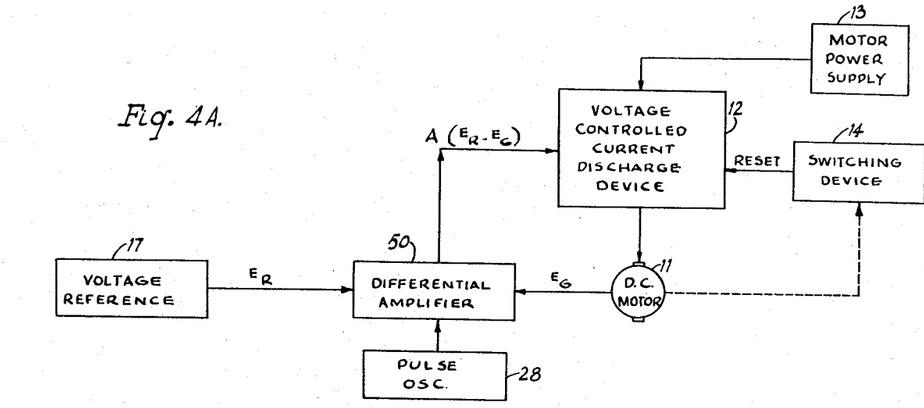
FIGS. 4a and 4b are, respectively, a block diagram and a schematic diagram of a synchronized electronic governor according to the invention.

FIG. 4a is a block diagram of another embodiment of the invention. As in the case of the earlier circuits, the circuit in FIG. 4a includes the direct-current motor 11, the S.C.R. 12 and the motor power supply 13 along with the switch 14 connected to the S.C.R. to make it periodically nonconductive. Instead of connecting the voltage reference source 17 directly to the S.C.R. 12, the circuit of FIG. 4a shows that the reference voltage $E_R$ is connected to a differential amplifier 50 having a second input circuit to which the back E.M.F. generated by the motor 11 is connected. Pulses from a pulse generator 28 are also applied to the differential amplifier in a manner to be described hereinafter. This back E.M.F. is indicated as $E_G$ and the output signal of the differential amplifier applied to control the S.C.R. 12 is $A(E_R - E_G)$, where $A$ is the gain of the amplifier.

Figures 4B, 8:
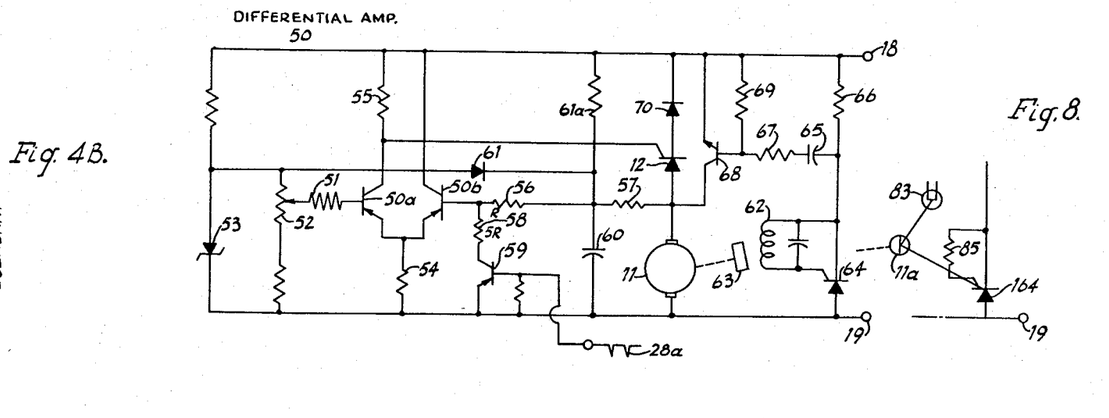
FIG. 8 is a schematic diagram of a modification of the circuit of FIG. 4.

In FIG. 4b the motor 11 is shown connected in series with the S.C.R. 12 between the terminals 18 and 19. The differential amplifier 50 comprises a first transistor 50a having its base connected through a current-limiting resistor 51 to the arm of a potentiometer 52 connected to the reference voltage source, which is a Zener diode 53 connected to the main voltage source. A resistor 54 forms a common emitter load resistor shared by the transistor 50a and a second transistor 50b. A collector load resistor 55 for the transistor 50a is connected to the power supply terminal 18 and there is a connection from the collector of transistor 50a to the gate electrode of the S.C.R. 12.

The base of the transistor 50b, which is the second transistor of the differential amplifier, is connected by two resistors 56 and 57 to one of the terminals of the motor 11. Another resistor 58 is also connected to the base of the transistor 50b and is in series with the emitter-collector circuit of a transistor 59. The base of this transistor is connected to a pulse generator 28 which may be of conventional construction, capable of producing short, sharp input pulses 28a, each of which causes the transistor 59 to become momentarily conductive. The capacitor 60 is connected between the common terminal 19 and the junction of resistors 56 and 57 as a filtering capacitor. A limited diode 61 is connected in series between this same junction and the negative terminal of the Zener diode 53, and a resistor 61a connected from the terminal 18 to the junction of diode 61 and capacitor 60 furnishes means to apply to the differential amplifier 50 a voltage based on the power supply voltage so that the operation of the governor will be stable even when the supply voltage changes.

Instead of a simple mechanical switch 14, the circuit of FIG. 4b includes a switching circuit that has a magnetic coil 62 located adjacent to the motor 11. The rotor has a magnet 63 attached to it or forming part of it and rotating close to the coil 62 to induce a varying voltage or pulses of voltage in it. The coil 62 is connected to a S.C.R. 64 to render it periodically conductive in synchronism with the pulses produced by the magnet 63. The S.C.R. 64 is connected to a circuit comprising a capacitor 65 and a resistor 66. The capacitor 65, in turn, is connected through a resistor 67 to the base of a switching transistor 78 which is biased through a resistor 69. The transistor 68 is connected in parallel with a series circuit that includes the S.C.R. 12 and a diode 70 so that when the transistor 68 becomes conductive the voltage across the S.C.R. 12 will render the latter nonconductive.

The operation of the circuit of FIG. 4 will be explained, in part, with reference to the waveforms in FIG. 5. The switching circuit for turning off the S.C.R. 12 is actuated by the voltage pulses produced in the coil 62. These pulses turn the S.C.R. 64 on, but it is immediately rendered non-conductive by the operation of the capacitor 65 so that the transistor 68 is energized by short impulses, that correspond to the pulses 45 in FIG. 5b, and only momentarily short-circuits the series circuit, including S.C.R. 12 and the diode 70. However, this is enough to make the S.C.R. 12 nonconductive.

Thereafter, the voltage across the motor 11 drops to its back E.M.F. value, as indicated by the descending level 47 in FIG. 5c, and this decreasing back E.M.F. is applied through the resistors 57 and 56 to the base of the transistor 50b. The resistance of the resistor 56 is chosen to have a value considerably less than the resistance of the resistor 58. For example, the resistor 56 may have a resistance ⅕ that of the resistor 58. As a result, when the next pulse 40 is applied to the base of the transistor 59 so as to render the latter conductive, the voltage at the base of the transistor 50b drops to only ⅚ of its value. This drop is still indicated in FIG. 5c by the negative-going pulse 47, but only if this drop is sufficient to bias the transistor 50b to a nonconductive state will the transistor 50a be made conductive. If the drop in the voltage level at the base of the transistor 50b is not sufficient for this purpose, the transistor 50a will not become conductive and hence will not make the S.C.R. 12 conductive.

One of the advantages of the differential amplifier is that it provides a very sharp voltage change to be applied to the gate electrode of the S.C.R. 12. This reduces the effect of any variation in the characteristics of the S.C.R. 12, insofar as stable operation of the governor is concerned, to the point where such variations can be neglected and the S.C.R. can be treated as a simple on-and-off device. In the simpler circuits of FIGS. 1 and 3 any variation in the characteristics of the S.C.R. will be reflected in the operation of the circuit, but that is not true in the circuit of FIG. 4b.

The purpose of the diode 61 is to limit the voltage excursions at the junction of the resistors 56 and 57 during the time that the S.C.R. 12 is conducting. The diode 61 does this without substantially adversely affecting the operation of the circuit during the time the S.C.R. 12 is nonconductive.

Figure 6:
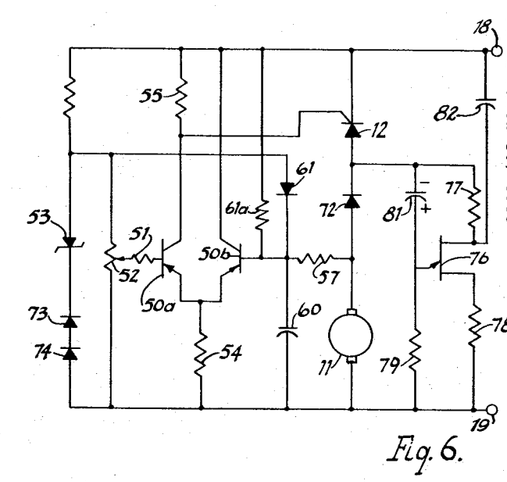
FIG. 6 is a non-synchronous electronic governor circuit according to the invention.

FIG. 6 is a schematic diagram of a non-synchronous electronic governor circuit, certain parts of which are similar to the circuit of FIG. 4b. In the circuit of FIG. 6 the motor 11 is connected in series with a diode 72 and the S.C.R. 12 between the power supply terminals 18 and 19. The resistor 57 and the capacitor 60 are connected across the motor 11 to filter out commutator noise as in the previous circuit, but the resistor 57 is connected directly to the base of the transistor 50b, and no external synchronizing signal source is provided. This transistor and the transistor 50a form the same differential amplifier as in FIG. 4b and have a common emitter resistor 54 and an output load resistor 55. The base of the transistor 50a is connected through the current-limiting resistor 51 to the arm of a potentiometer 52 which is connected across a source of regulated voltage comprising the Zener diode 53 and associated diodes 73 and 74. The diode 61 is connected from the Zener diode 53 to the base of the transistor 50b. The output signal of the differential amplifier is connected from the collector of the transistor 50a to the gate electrode of the S.C.R. 12, and the stabilizing resistor 61a described in connection with FIG. 4b is also included in this circuit.

The S.C.R 12 is turned off by a uni-junction transistor circuit comprising a uni-junction transistor 76 having two resistors 77 and 78 connected in series with its base terminals. A resistance-capacitance circuit comprising a resistor 79 and a capacitor 81 connected in series is connected in parallel with the series circuit comprising the uni-junction transistor 76 and the two resistors 77 and 78. The junction between the resistor 79 and the capacitor 81 is connected directly to the emitter of the uni-junction transistor. The junction between the capacitor 81 and the resistor 77 is connected to the junction of the diode 72 and the S.C.R. 12 and a capacitor 82 is connected from the voltage supply terminal 18 to a junction between the resistor 77 and one of the base terminals of the transistor 76.

In operation, the capacitor 81 charges up until the voltage at the emitter of the uni-junction transistor reaches the level that causes this transistor to become conductive. At this point, the voltage at the junction of the diode 72 and the S.C.R. 12 is instantaneously changed to a level at which the S.C.R. becomes nonconductive and remains so until the back E.M.F. of the motor 11 decreases to a level that will make the transistor 50b nonconductive. This level is determined by the setting of the potentiometer 52 as controlled by the reference voltage. As in the preceding circuit, when the transistor 50a becomes conductive it causes the S.C.R. 12 also to become conductive. Comparison between the back E.M.F. and the reference voltage thus takes place in the differential amplifier rather than in the S.C.R., as was the case in the circuits of FIGS. 1 and 3.

The S.C.R. 12 and the uni-junction transistor 76 are connected in a one-shot multivibrator type of circuit so arranged that the uni-junction transistor reaches the conductive state at a predetermined time after the S.C.R. has begun to conduct, determined primarily by the R-C circuit comprising the resistor 79 and the capacitor 81. This one-shot circuit operates to turn the S.C.R. off when the uni-junction transistor becomes conductive, and as a result power is applied to the motor 11 in a series of equal-duration pulses, each of which begins when the differential amplifier causes the S.C.R. 12 to conduct and ends when the uni-junction transistor conducts. The time spacing between successive pulses varies automatically to set the average power to a level at which the motor runs at the desired speed. This circuit is capable of holding the speed of the motor to within ±2%, or less, of a predetermined speed, in spite of aging of the parts and in spite of wide temperature variations. Moreover, the circuit of FIG. 6 is relatively self-contained in that it does not require a separate pulse generator.

Figure 7:
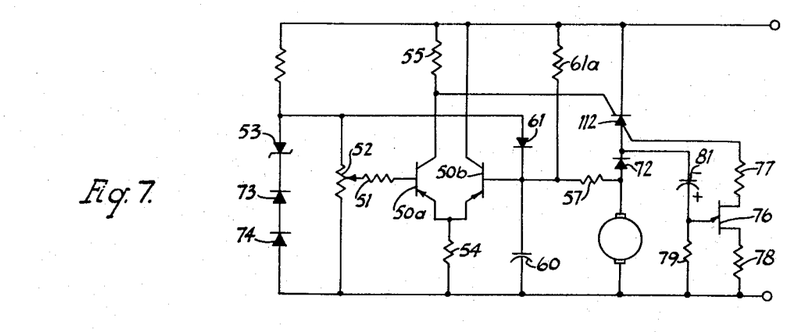
FIG. 7 is a modified form of the circuit of FIG. 6.

FIG. 7 shows a circuit generally similar to that of FIG. 6 except that, instead of the S.C.R. 12 of FIG. 6, the circuit of FIG. 7 uses an S.C.S. 112. This is a voltage controlled current discharge device having an anode gate electrode to which a turn-off voltage may be applied. When the anode gate electrode is biased with a polarity opposite that for conduction, the loop gain of the S.C.S. is reduced below the unity figure required for the S.C.S. to remain conductive.

The circuitry to the left of the S.C.S. 112 is identical with the corresponding portion of the circuit of FIG. 6 and therefore will not be described. The circuit for turning off the S.C.S. 112 includes the same uni-junction transistor 76 together with its resistors 77 and 78 and the resistor 79 which forms part of a resistance-capacitance series circuit with the capacitor 81. Instead of connecting the resistor 77 directly to the capacitor 81, as in FIG. 6, it is connected to the anode gate electrode of the S.C.S. 112. The capacitor 81 continues to be connected to the junction between the S.C.S. 112 and the diode 72.

By means of the circuit shown, when the capacitor 81 charges up to a certain level, the uni-junction transistor 76 becomes conductive. This permits the capacitor to be discharged through a circuit comprising the emitter and the upper, or base 76a, electrode of the transistor 76, the resistor 77 and the anode gate to anode of the S.C.S. 112. The resultant current from the discharging capacitor causes the S.C.S. to become nonconductive. The S.C.S. 112 is returned to its state of conductivity when the transistor 50a is made conductive at the time that the back E.M.F. across the motor 11 reaches a value substantially equal to the value of the reference voltage as applied to the base of the transistor 58.

FIG. 8 shows a modification for the circuit of FIG. 4b, by means of which S.C.R. 12 can be made nonconductive in response to flashes of light. FIG. 8 includes a light-sensitive S.C.R. 164 which becomes conductive upon being exposed to sufficient light. The light-sensitive S.C.R. 164 has a gate electrode resistor 82 to keep the gate electrode at the proper voltage level and is turned off by the same impulse circuit as the S.C.R. 64 in FIG. 4b.

The light pulses may be produced by reflecting light from a source 83 off a flat surface on the shaft 11a of the motor so that the reflected light strikes the light-sensitive S.C.R. 164 each time this shaft reaches a predetermined orientation. Thereupon, the S.C.R. 164 will become conductive and will initiate operation of the remainder of the circuit exactly as in the case of the S.C.R. 64 in FIG. 4b.

Figure 9:
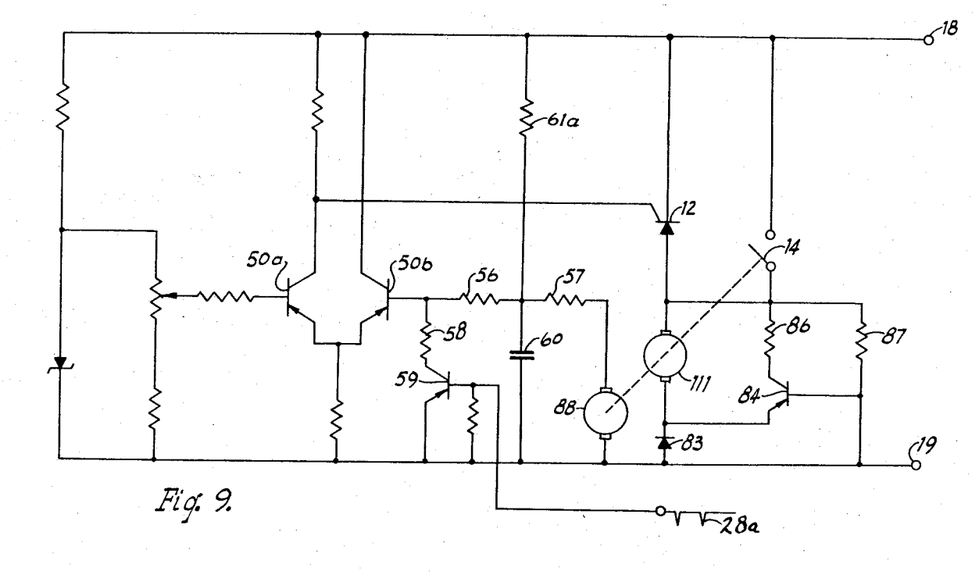
FIG. 9 shows a schematic diagram of an electronic governor for use with large direct-current motors.

FIG. 9 shows a circuit for synchronous operation of a relatively large motor in which the E.M.F. of a separate generator is used for comparison, rather than the back E.M.F. of the large motor. The circuit of FIG. 9 includes a motor 111, the speed of which is to be controlled. This motor is connected in series with a diode 83 to one terminal 19 of a power supply source. The motor 111 is also connected in series with the S.C.R. 12 to the other terminal 18 of the power supply. A switch 14 is connected electrically in parallel with the S.C.R. 12 and mechanically to the rotor of the motor 111 to be closed synchronously with the rotation thereof. The emitter-collector circuit of a transistor 84 is connected in series with a resistor 86 directly across the motor 111 and another resistor 87 is connected from the base of the transistor 84 to the junction of the resistor 86, the switch 14, the S.C.R. 12, and the motor 111. The base of the transistor 84 is also connected to the terminal 19 of the power supply.

The measuring portion of the circuit includes a generator 88 which may be capable of generating a higher voltage than the back E.M.F. of the motor 111 and may have more commutator segments so that it will produce a smoother voltage output. The generator 88 is connected to a circuit which is essentially the same as the measuring part of the circuit of FIG. 4b and includes the same resistor 57 and capacitor 60 across the generator, and the same voltage-dividing resistors 56 and 58 connected in series with the transistor 59. The transistor is energized by voltage pulses 40 applied to its base. The junction of the resistors 56 and 58 is connected to the transistor 50b, which is part of the differential amplifier, together with the transistor 50a. The remaining elements of the circuit are identical with those of FIG. 4b.

The operation of circuit of FIG. 9 begins when the switch 14 is closed to render the S.C.R. 12 nonconductive. Thereupon, the motor 11 begins to slow down and the voltage generated by the generator 88 begins to decrease. Subsequently, one of the pulses 28a causes the transistor 59 to become conductive and, if the output of the generator 88 has reached a sufficiently low level, the transistor 50b becomes nonconductive and the transistor 50a becomes conductive, returning the S.C.R. 12 to the conductive state.

The transistor 84 acts as a load on the motor 11 during the time that the motor is not receiving power from the power supply. This helps the rotor to lag behind the position that it would otherwise occupy if the motor were receiving power, and thereby makes more positive the operation of the control circuit.

The foregoing specific examples are to be considered merely as illustrative and not as a limitation on the scope of the invention which is defined only by the following claims.

What is claimed is:

1. An electronic governor circuit for a direct-current motor, said circuit comprising: a voltage controlled current discharge device connected in series with said motor, said device comprising a gating electrode and at least two other electrodes; switching means connected to said discharge device to render it periodically nonconductive; a reference voltage source; a source of voltage, the magnitude of which is determined, in part, by the rotational speed of said motor; and circuit means to connect said gating electrode to one of said sources and one of said other electrodes to the other of said sources to render said discharge device conductive when the rotational speed of said motor has dropped below a predetermined magnitude.

2. An electronic governor circuit for a direct-current motor, said circuit comprising: a voltage controlled current discharge device connected in series with said motor, said device comprising a gating electrode; switching means connected to said discharge device to render it periodically nonconductive; and circuit means to connect said gating electrode to a reference voltage source, whereby said discharge device again becomes conductive when the back E.M.F. of said motor has dropped below a predetermined magnitude.

3. An electronic governor circuit for a direct-current motor, said circuit comprising: a voltage controlled current discharge device comprising an anode electrode and a cathode electrode and a gating electrode, said anode and cathode electrodes being connected in series with said motor; switching means connected to said discharge device to render it periodically nonconductive; circuit means to connect said gating electrode to a reference voltage source, whereby said discharge device is biased by the difference between the reference voltage and the back E.M.F. of the motor to remain nonconductive until the back E.M.F. of said motor has dropped to a predetermined magnitude below the magnitude of the reference voltage.

4. An electronic governor circuit for a direct-current motor, said circuit comprising: a voltage controlled current discharge device connected in series with said motor, said device comprising a gating electrode; switching means connected to said discharge device to render it periodically nonconductive; a diode in series with said gating electrode to connect said gating electrode to a reference voltage source; and a resistor connecting said motor to said diode, said discharge device becoming conductive only when the back E.M.F. of said motor has dropped below the magnitude of the reference voltage.

5. An electronic governor circuit for a direct-current motor having a rotor and voltage-receiving terminals, said circuit comprising: a voltage controlled current discharge device connected in series with said terminals, said device comprising an anode electrode, a cathode electrode connected to said motor, and a gating electrode switch controlled by said rotor and electrically connected to said discharge device to render it periodically nonconductive; and circuit means to connect said gating electrode to a reference voltage source, whereby said discharge device again becomes conductive only when the back E.M.F. of said motor has dropped below the level of the reference voltage.

6. The electronic governor circuit of claim 5 in which said switch is connected in parallel with said discharge device to short-circuit the same and thereby render it repetitively nonconductive as said rotor rotates.

7. The electronic governor circuit of claim 5 in which said switch is connected in series with said anode and cathode electrodes of said discharge device to render said discharge device repetitively nonconductive as said rotor rotates.

8. The governor circuit of claim 5 in which said switch is of a substantially instantaneous-operating type to return said discharge device substantially immediately to a condition in which it can conduct.

9. The governor circuit of claim 5 in which said switch is directly controlled by said rotor to be operated thereby once each revolution.

10. The governor of claim 5 in which said switch comprises a uni-junction transistor pulse-generating circuit.

11. The governor of claim 5 in which said discharge device comprises a silicon-controlled switch.

12. The governor of claim 5 in which said switch comprises a magnet attached to said motor to rotate therewith; a coil adjacent to said magnet to have voltage impulses produced therein as said magnet rotates; and second circuit means connecting said coil to said discharge device to render said discharge device nonconductive upon the occurrence of said impulses.

13. The governor of claim 12 in which said second circuit means comprises a second voltage controlled current discharge device.

14. The governor of claim 5 in which said discharge device comprises a silicon-controlled rectifier.

15. The governor of claim 14 in which said switch comprises a light-sensitive silicon-controlled rectifier; a source of light; means attached to said motor to control the light reaching said light-sensitive silicon-controlled rectifier from said source in accordance with the rotation of said motor; and second circuit means connecting said light-sensitive silicon-controlled rectifier to said first-named silicon-controlled rectifier.

16. An electronic governor circuit for a direct-current motor, said circuit comprising: a voltage controlled current discharge device connected in series with said motor, said device having a gating electrode; a transistor connected to said discharge device; an impulse signal source connected to said transistor to change its state of conductivity to render said voltage controlled current discharge device periodically nonconductive; circuit means to connect said gating electrode to a reference voltage source; and a connection from said motor to said circuit means to render said discharge device conductive when the back E.M.F. of said motor has dropped below the magnitude of said reference voltage.

17. The governor of claim 16 in which said circuit means comprises a differential amplifier.

18. An electronic governor circuit for a direct-current motor, said circuit comprising: a voltage controlled current discharge device connected in series with said motor, said device comprising a gating electrode; switching means connected to said discharge device to render it periodically nonconductive; circuit means comprising a variable voltage divider connected to said gating electrode to connect said gating electrode to a reference voltage source; and a feedback circuit connecting said motor to said circuit means to render said discharge device conductive when the back E.M.F. of said motor has dropped below the voltage output of said voltage divider, whereby the speed of said motor can be varied by varying said voltage divider.

19. An electronic governor circuit for a direct-current motor having a rotor and voltage-receiving terminals, said circuit comprising: a silicon controlled rectifier comprising an anode, a cathode, and a gating electrode; a mechanical switch mechanically connected to said rotor to be operated thereby and electrically connected in parallel with said anode and cathode to render said silicon controlled rectifier periodically nonconductive as said rotor rotates; circuit means to connect said gating electrode to a reference voltage source; a feedback connection from said voltage-receiving terminals of said motor to said circuit means to render said silicon-controlled rectifier conductive when the back E.M.F. of said motor has dropped below a predetermined magnitude; and a transistor connected to said voltage-receiving terminals to be rendered periodically conductive to reduce relatively suddenly the effective back E.M.F. applied to said circuit means.

20. An electronic governor circuit for a direct-current motor having a rotor and voltage-receiving terminals, said circuit comprising: a silicon controlled rectifier connected in series with said terminals and comprising anode, cathode, and gate electrodes; a switch mechanically connected to said rotor to be actuated by rotation thereof to become momentarily closed at a certain point in each revolution of said rotor and electrically connected in parallel with said anode and cathode electrodes to render said silicon controlled rectifier nonconductive each time said switch is closed; a first transitor having a base connected to a reference voltage source, a collector output circuit connected to said gating electrode, and an emitter; a second transistor having an emitter output circuit connetced to said emitter of said first transistor whereby said second transistor is differentially conductive with respect to said first transistor; a third transistor; a voltage divider connected across said voltage-receiving terminals and comprising first and second impedances and said third transistor, said third transistor being rendered periodically conductive to change the voltage division ratio of said voltage divider, said second transistor having a base connected to said voltage divider to be rendered conductive when the voltage division ratio reaches a predetermined value with respect to the reference voltage after said third transistor becomes conductive, whereby said first transistor becomes conductive to produce an output signal to cause said silicon controlled rectifier to become conductive and supply operating voltage to said voltage-reeiving terminals.

21. The electronic governor circuit of claim 20 in which said first and second impedances are first and second resistors and said first resistor has a resistance of R ohms and is connected in series between the base of said second transistor and one of said voltage-receiving terminals, and said second resistor has a resistance of at least substantially 5R ohms and is connected in series between the base of said second transistor and the output circuit of said third transistor whereby the base of said second transistor is energized with a voltage of approximately ⅚V, where V is the voltage between said voltage-receiving terminals.

22. An electronic governor circuit for a direct-current motor, said circuit comprising: a voltage controlled current discharge device connected in series with said motor and having a gating electrode; switching means connected to said discharge device to render it periodically nonconductive; circuit means to connect said gating electrode to a reference voltage source; and a feedback mechanism comprising a generator mechanically connected to said motor to be operated thereby and electrically connected to said circuit means to render said discharge device conductive when the rotor of said motor slows to a predetermined speed.

23. The electronic governor circuit of claim 22 comprising, in addition, a uni-directional current discharge device connected effectively in parallel with said motor to be rendered conductive in order to place an electrical load on said motor when said voltage controlled current discharge device becomes nonconductive.

References Cited

UNITED STATES PATENTS

| 3,221,235 | 11/1965 | Scholl | 318—345 X |
| 3,095,534 | 6/1963 | Cockrell | 318—331 |
| 3,123,757 | 3/1964 | Gaudet | 318—327 |
| 3,286,151 | 11/1966 | Dinger | 318—331 |
| 3,293,524 | 12/1966 | Parrish | 318—331 |

ORIS L. RADER, *Primary Examiner.*

J. J. BAKER, *Assistant Examiner.*